United States Patent Office 3,520,829
Patented July 21, 1970

3,520,829
HYDROCONVERSION CATALYST

Bernard F. Mulaskey, Pinole, Calif., assignor to Chevron Research Company, San Francisco, Calif., a corporation of Delaware
No Drawing. Continuation-in-part of application Ser. No. 742,321, July 3, 1968, which is a continuation-in-part of application Ser. No. 645,855, June 8, 1967, which in turn is a continuation-in-part of application Ser. No. 568,536, July 28, 1966. This application Nov. 7, 1968, Ser. No. 774,207
Int. Cl. B01j 11/40, 11/58
U.S. Cl. 252—454                4 Claims

ABSTRACT OF THE DISCLOSURE

A novel catalyst composition consisting essentially of nickel, or compounds thereof, and tin, or compounds thereof, associated with a crystalline zeolitic aluminosilicate.

CROSS-REFERENCE

This application is a continuation-in-part of application Ser. No. 742,321, filed July 3, 1968, which is in turn a continuation-in-part of application Ser. No. 645,855, filed June 8, 1967, now Pat. No. 3,399,132, which in turn is a continuation-in-part of application Ser. No. 568,536, filed July 28, 1966, now abandoned.

BACKGROUND OF THE INVENTION

Field

The present invention relates to a novel hydroconversion catalyst. More particularly, the present invention relates to a catalyst consisting essentially of nickel and tin, or their compounds, associated with a crystalline zeolitic aluminosilicate and hydrocracking processes using said catalyst.

Prior art

It is known that crystalline zeolitic aluminosilicates can be used as catalysts in a variety of hydroconversion processes including, by way of example, isomerization, disproportionation, reforming, hydrofining, including hydrodenitrification and hydrodesulfurization, and hydrocracking. The crystalline zeolitic aluminosilicates can be used either alone or can be admixed with an amorphous porous inorganic oxide. A variety of different metals may be present on the zeolite, depending on the particular hydroconversion process.

SUMMARY OF THE INVENTION

The object of the present invention is to provide an improved catalyst comprising a crystalline zeolitic aluminosilicate, nickel, or compounds of nickel, and tin, or compounds of tin. The novel catalyst is particularly useful in hydrocracking processes.

Thus, the present invention is directed to a catalytic composition of matter consisting essentially of a crystalline zeolitic aluminosilicate, preferably a crystalline zeolitic aluminosilicate having uniform pore diameters of at least 6 Angstroms, in association with nickel and tin, or their compounds, said nickel and tin being present in an amount of from 2 to 50 combined weight percent metals, with a nickel to tin weight ratio of from 0.25 to 20.

DESCRIPTION OF THE INVENTION

Crystalline zeolitic aluminosilicates, referred to hereinafter as zeolites, are well known in the art. The zeolites comprise aluminosilicate cage structures in which alumina and silica tetrahedra are intimately connected with each other in an open three-dimensional network. The tetrahedra are cross-linked by the sharing of oxygen atoms. In general, the spaces between the tetrahedra are occupied by water molecules prior to dehydration. Dehydration results in crystals interlaced with channels or pores of molecular dimensions, which channels or pores selectively limit the size and shape of foreign substances that can be adsorbed. Thus, the zeolites are often referred to as molecular sieves. In general, the zeolites have exchangeable zeolitic cations associated with the silica-alumina tetrahedra which balance the negative electrovalence of the tetrahedra. The cations may be any number of ions such as, for example, the alkali metal ions, the alkaline earth ions, and the rare earth ions. The cations may be mono-, di-, or trivalent. In general the preferred forms of zeolites are those wherein the exchangeable zeolitic cations are divalent metals, and/or hydrogen. Normally the zeolites are prepared first in the sodium or potassium form, after which the monovalent cations are ion-exchanged out with desired divalent metal cations, such as calcium, magnesium or manganese cations, or where the hydrogen form is desired, with ammonium cations followed by heating to decompose the ammonium cations to leave hydrogen ions. The hydrogen form is often referred to as decationized.

The zeolites for purposes of the present invention possess relatively well-defined pore structures. It is preferred that the pore structure of the zeolites comprise openings characterized by pore diameters greater than 6 Angstroms and particularly uniform pore diameters of approximately 6–15 Angstroms. The uniform pore structure wherein the pores are greater than 6 Angstroms permits hydrocarbons access to the catalyst. Furthermore, zeolites which find the greatest use for purposes of the present invention have silica/alumina ratios in the crystalline form greater than about 2. Examples of appropriate crystalline zeolitic aluminosilicates, i.e., zeolites, are the natural faujasites, synthesized zeolite X disclosed in U.S. Pat. 2,882,244, zeolite Y disclosed in U.S. Pat. 3,130,007, zeolite L disclosed in U.S. Pat. 3,216,789, and decationized zeolite Y described in U.S. Pat. 3,130,006. Mordenites may also be used.

The catalytic composition of the present invention comprises nickel and tin, or compounds thereof, preferably present in an amount from 2 to 50 combined weight percent metals. That is, regardless of the form in which nickel and tin exist in the catalyst, whether as metallic nickel and tin, or as compounds, such as the oxides or sulfides, the total combined weight percent of nickel and tin in the catalyst, calculated as the metals, should be from 2 to 50. A catalyst containing less than 2 weight percent hydrogenating metal content is too low in hydrogenating activity to be useful, for example, in hydrocracking of hydrocarbons; rather, hydrocracking with such a catalyst results in the production of excessive coke which results in rapid deactivation of the catalyst. Catalyst compositions comprising total hydrogenating metal contents in excess of 50 weight percent can be prepared and employed in hydrocarbon hydroconversion processes. Generally, however, it is not advantageous to exceed 50 weight percent hydrogenating metal content in a catalyst because of the high cost of the hydrogenating metal components and also because high hydrogenating metal content severely limits the amount of zeolite. Preferably, catalysts of the present invention comprise nickel and tin, or compounds thereof, in an amount from 5 to 30 combined weight percent and still more preferably from 7 to 25.

The nickel and tin, or compounds thereof, should be present in the catalyst in a weight ratio of nickel to tin of from 0.25 to 20, determined as the metals. Preferably, the nickel to tin weight ratio is from 0.5 to 20 and most preferably, 0.5 to 10. In general, when employing high combined weights of nickel and tin, it is preferred to use high nickel to tin weight ratios.

The nickel and tin can exist with the zeolite in the metallic form or the elemental form or in the compound form, for example, in the oxide or sulfide form. The sulfide form of the metals is the preferred compound form for purposes of the present invention. However, any compound of the metals which perform as hydrogenating components can be used in the catalyst.

The catalyst of the present invention can be prepared by any of a variety of methods. Thus, the metals can be associated with the zeolite by impregnation which is generally accomplished by using an aqueous solution of a suitable nickel compound and/or tin compound. Either simultaneous or sequential impregnation of the metal compounds is suitable. Also, the metals can be associated with the zeolite by ion-exchange. Ion-exchange is generally accomplished by using an aqueous solution of a suitable metal salt wherein the nickel and/or tin is present in the cationic state. Nickel and/or tin replaces the sodium or other exchangeable cations present in the zeolite. Typical nickel and tin compounds which can be used for impregnation and/or ion-exchange are the chlorides, nitrates, sulfates, acetates and amine complexes. It is understood that one of the metals can be associated with the zeolite by one method, e.g., by impregnation, and the other metal associated with the zeolite by another method, e.g., ion-exchange. Another method of associating the metals with the zeolite is by vapor phase adsorption.

The novel catalyst of the present invention finds particular use in hydrocracking processes wherein hydrocarbons are converted to lower boiling products in the presence of hydrogen and a catalyst at elevated temperatures and pressures. The presence of tin in the catalyst comprising nickel and a zeolite imparts increased hydrogenation activity and hydrocracking activity to the catalytic composite as compared to a catalyst comprising nickel and zeolite but no tin. Furthermore the presence of tin permits the hydrogenation activity of the catalyst to be controlled in an essentially reversible manner by varying the amount of sulfur present in the feed.

In addition, catalysts comprising nickel and zeolite but without tin show increased nickel crystallite growth during hydrocracking. This phenomenon has in the past led to the use of more stable hydrogenating components, such as, palladium, in the zeolite combination. The presence of tin with nickel decreases or substantially eliminates the growth of nickel crystallities during hydrocracking.

Hydrocracking with the novel catalyst can be accomplished at a temperature of from about 450° to 900° F. and a pressure between about 500 to 10,000 p.s.i.g. The higher temperatures and pressures are used with higher boiling feedstocks. Preferably pressures between 1200 and 6000 p.s.i.g. are used. The hydrogen flow rate into the reactor is maintained between 1,000 to 20,000 s.c.f./bbl. of feed and preferably in the range 4,000 to 10,000 s.f.c./bbl. The hydrogen consumption will vary depending on the properties of the feed and the other hydrocracking conditions used, but there is generally consumed in the hydrocracking zone at least 500 s.c.f./bbl. of hydrogen per barrel of feed. In general, the hydrogen consumption will range from 500 to 5,000 s.c.f./bbl. The excess hydrogen not consumed in the reaction is separated from the treated feed and preferably purified and recycled. The liquid hourly space velocity (LHSV) will generally be in the range from 0.1 to 10 and preferably, 0.3 to 5.

Typical feedstocks which can be hydrocracked with the nickel-tin zeolite catalyst include feeds boiling from below 300° to 1100° F. or higher. Particular feedstocks which may be used include heavy virgin crudes, vacuum distillation residues, catalytic cycle oils, gas oils resulting from the visbreaking of heavy oils, solvent deasphalted oils, and hydrocarbon distillates. These hydrocarbon fractions can be derived from petroleum crude oils, gilsonite, shale oils, tar sand oils, coal hydrogenation and carbonization products and the like. The feedstocks may contain nitrogen and/or sulfur compounds.

EXAMPLE

A catalyst consisting essentially of nickel and tin and zeolite was prepared by impregnating a zeolite of the Y-type with a nickel chloride and tin chloride solution. The impregnated zeolite catalyst was dried, calcined, and sulfied by conventional processes. The catalyst contained 9.1 weight percent nickel and 4.6 weight percent tin, the remainder being zeolite.

The catalyst was used for hydrocracking a light catalytic cycle oil having the following specifications:

Gravity, ° API _____ 29.3
Aniline point, ° F. _____ 119.4
Nitrogen, p.p.m. _____ 0.14
Aromatics, vol. percent _____ 29.4
Naphthenes, vol. percent _____ 59.6
Paraffins, vol. percent _____ 11.0
Feed distillation range, ° F.:

Start _____ 406
    5% _____ 438
    10% _____ 453
    30% _____ 480
    50% _____ 511
    70% _____ 557
    90% _____ 624
    95% _____ 658
    End point _____ 719

The hydrocracking reaction conditions included a pressure of 1200 p.s.i.g., a liquid hourly space velocity of 2.0, a hydrogen to hydrocarbon rate of 12,000 s.c.f./bbl., and a reactor temperature of about 570° F. The catalyst was found to be effective for hydrocracking.

The foregoing disclosure of this invention is not considered to be limiting since variations can be made by those skilled in the art without departing from the scope and spirit of the appended claims.

I claim:

1. In a hydrocarbon hydroconversion catalyst consisting essentially of a crystalline zeolitic aluminosilicate, nickel, or compounds thereof, the improvement which comprises having tin, or oxides, or sulfides thereof present, said nickel, or compounds thereof and said tin, or oxides, or sulfides thereof, being present in an amount of from 2 to 50 combined weight percent metals, with a nickel to tin weight ratio of from 0.25 to 20, said tin being present in sufficient amount to substantially decrease nickel crystallite growth during hydroconversion reactions.

2. The catalyst of claim 1 wherein said crystalline zeolitic aluminosilicate is of the Y-type.

3. The catalyst of claim 1 wherein said crystalline zeolitic aluminosilicate is decationized.

4. The catalyst of claim 1 wherein said nickel, or oxides, or sulfides thereof, and said tin, or compounds thereof, are present in an amount of from 5 to 30 combined weight percent metals, with a nickel to tin weight ratio of from 0.25 to 20.

References Cited

UNITED STATES PATENTS 2,911,356  11/1959  Hanson _____ 208—110
3,140,253   7/1964  Plank et al. _____ 252—455 X
3,401,125   9/1968  Jaffe _____ 252—453 X DANIEL E. WYMAN, Primary Examiner C. F. DEES, Assistant Examiner U.S. Cl. X.R.

252—455